United States Patent
Tung et al.

(10) Patent No.: US 8,612,300 B2
(45) Date of Patent: Dec. 17, 2013

(54) BUYER/SUPPLIER NETWORK THAT AIDS SUPPLIER ENABLEMENT THROUGH COLLABORATION BETWEEN BUYERS AND SUPPLIERS

(75) Inventors: Yuan Tung, Fremont, CA (US); Manju Prasad Subbanna, Bangalore (IN); Sanish Mondkar, San Francisco, CA (US)

(73) Assignee: Ariba, Inc., Sunnyvale, CA (US)

( * ) Notice: Subject to any disclaimer, the term of this patent is extended or adjusted under 35 U.S.C. 154(b) by 195 days.

(21) Appl. No.: 13/249,876

(22) Filed: Sep. 30, 2011

(65) Prior Publication Data

US 2012/0022963 A1    Jan. 26, 2012

Related U.S. Application Data

(63) Continuation-in-part of application No. 11/517,944, filed on Sep. 8, 2006, now Pat. No. 8,190,482.

(51) Int. Cl.
G06Q 30/00    (2012.01)

(52) U.S. Cl.
USPC .............. 705/26.1; 705/26.35; 705/26.41; 705/26.8

(58) Field of Classification Search
USPC .................................. 705/26.1–28
See application file for complete search history.

(56) References Cited

U.S. PATENT DOCUMENTS

| | | |
|---|---|---|
| 6,285,989 B1 | 9/2001 | Shoham |
| 6,584,451 B1 | 6/2003 | Shoham et al. |
| 6,606,603 B1 | 8/2003 | Joseph et al. |
| 6,952,682 B1 | 10/2005 | Wellman |
| 7,072,061 B2 | 7/2006 | Blair et al. |
| 7,117,165 B1 | 10/2006 | Adams et al. |
| 7,130,815 B1 | 10/2006 | Gupta |
| 7,146,331 B1 | 12/2006 | Young |
| 7,152,043 B2 | 12/2006 | Alaia et al. |
| 7,225,145 B2 | 5/2007 | Whitley et al. |
| 7,225,152 B2 | 5/2007 | Atkinson et al. |
| 7,249,085 B1 | 7/2007 | Kinney, Jr. et al. |
| 7,283,979 B2 | 10/2007 | Tulloch et al. |
| 7,283,980 B2 | 10/2007 | Alaia et al. |
| 7,296,001 B1 | 11/2007 | Ephrati et al. |
| 7,346,574 B2 | 3/2008 | Smith et al. |
| 7,383,206 B2 | 6/2008 | Rupp et al. |
| 7,395,238 B2 | 7/2008 | Alaia et al. |
| 7,401,035 B1 | 7/2008 | Young |
| 7,444,299 B2 | 10/2008 | Smith et al. |
| 7,483,852 B2 | 1/2009 | Marhafer et al. |

(Continued)

OTHER PUBLICATIONS

Agresso/Alito Partnership Provides End-toEnd E-procurement Capability. M2 Presswire. Apr. 14, 2005.*

*Primary Examiner* — William Allen
(74) *Attorney, Agent, or Firm* — Brian R. Short (57) ABSTRACT

Embodiments of methods, systems and apparatus for a buyer/supplier network aiding supplier enablement through creation of a requisition between a buyer and a supplier are disclosed. One method includes receiving, by the buyer/supplier network, a collaboration request for information about a good or service being purchased by a buyer. At least one supplier is identified from an approved supplier list that has the requested information. An account is created for each of the identified suppliers on the buyer/supplier network, and an invitation is sent to each of the suppliers to join the buyer/supplier network. Each of the invited suppliers is allowed to log into the buyer/supplier network through the invitation, and address the request for information.

20 Claims, 5 Drawing Sheets

(56) References Cited

U.S. PATENT DOCUMENTS

| | | |
|---|---|---|
| 7,499,876 B2 | 3/2009 | Rupp et al. |
| 7,536,362 B2 | 5/2009 | Starr et al. |
| 7,558,746 B2 | 7/2009 | Alaia et al. |
| 7,558,752 B1 | 7/2009 | Ephrati et al. |
| 7,571,137 B2 | 8/2009 | Alaia et al. |
| 7,599,878 B2 | 10/2009 | Atkinson et al. |
| 7,634,439 B1 | 12/2009 | Smith |
| 7,657,461 B2 | 2/2010 | Young |
| 7,693,747 B2 | 4/2010 | Bryson et al. |
| 7,792,707 B2 | 9/2010 | Alaia et al. |
| 7,792,713 B1 | 9/2010 | Kinney, Jr. et al. |
| 7,813,966 B2 | 10/2010 | Alaia et al. |
| 7,835,957 B1 | 11/2010 | Kinney, Jr. |
| 7,840,476 B1 | 11/2010 | Zack et al. |
| 7,870,034 B2 | 1/2011 | Rupp et al. |
| 7,870,054 B2 | 1/2011 | Abeshouse et al. |
| 7,870,115 B2 | 1/2011 | Blair et al. |
| 7,921,053 B2 | 4/2011 | Kinney, Jr. et al. |
| 7,974,908 B1 | 7/2011 | Hommrich et al. |
| 8,086,518 B1 | 12/2011 | Maor |
| 8,095,451 B2 | 1/2012 | Smith et al. |
| 8,126,701 B2 | 2/2012 | Beck |
| 8,126,799 B2 | 2/2012 | Kellam et al. |
| 8,190,482 B1 | 5/2012 | Federighi et al. |
| 2002/0038292 A1 | 3/2002 | Quelene |
| 2002/0103746 A1* | 8/2002 | Moffett, Jr. .................... 705/37 |
| 2002/0173924 A1* | 11/2002 | Lin ................................ 702/81 |
| 2007/0214060 A1 | 9/2007 | Whitley et al. |
| 2007/0239596 A1 | 10/2007 | Kinney, Jr. et al. |
| 2007/0299765 A1 | 12/2007 | Smith et al. |
| 2008/0027879 A1 | 1/2008 | Ephrati et al. |
| 2008/0065526 A1 | 3/2008 | Smith et al. |
| 2008/0071672 A1 | 3/2008 | Rupp et al. |
| 2008/0133377 A1 | 6/2008 | Alaia et al. |
| 2008/0133397 A1 | 6/2008 | Tulloch et al. |
| 2008/0133398 A1 | 6/2008 | Kinney et al. |
| 2008/0133399 A1 | 6/2008 | Rupp et al. |
| 2008/0147533 A1 | 6/2008 | Alaia et al. |
| 2008/0147534 A1 | 6/2008 | Ephrati et al. |
| 2008/0154763 A1 | 6/2008 | Alaia et al. |
| 2008/0162285 A1 | 7/2008 | Tulloch et al. |
| 2008/0162330 A1 | 7/2008 | Atkinson et al. |
| 2008/0162331 A1 | 7/2008 | Ephrati et al. |
| 2008/0162332 A1 | 7/2008 | Alaia et al. |
| 2008/0183614 A1 | 7/2008 | Gujral et al. |
| 2008/0208616 A1 | 8/2008 | Young |
| 2009/0099933 A1 | 4/2009 | Marhafer et al. |
| 2010/0017273 A1 | 1/2010 | Hommrich et al. |
| 2011/0166951 A1 | 7/2011 | Abeshouse et al. |
| 2012/0296780 A1* | 11/2012 | McEntire .................... 705/27.2 |

* cited by examiner

FIGURE 5

BUYER/SUPPLIER NETWORK THAT AIDS SUPPLIER ENABLEMENT THROUGH COLLABORATION BETWEEN BUYERS AND SUPPLIERS

RELATED APPLICATIONS

This patent application is a continuation-in-part (CIP) of U.S. patent application Ser. No. 11/517,944, filed Sep. 8, 2006, which is herein incorporated by reference.

FIELD OF THE DESCRIBED EMBODIMENTS

The described embodiments relate generally to a supplier/buyer commerce network. More particularly, the described embodiments relate to a methods, apparatuses and systems for a supplier/buyer commerce network that aids enablement of a supplier through collaboration between a buyer and a supplier.

BACKGROUND

Some supplier networks include a transaction routing hub that connects one or more suppliers and one or more buyers. As an example of how a supplier network is used, in some cases a given buyer enters or provides purchase information electronically and the purchase information is routed or otherwise sent to a given supplier. This may, for example, enable a buyer to make purchases in a completely paperless manner. Getting suppliers to join a supply network (that is, supplier enablement) is a necessary task but is often very time consuming. Improved techniques for supplier enablement would be desirable.

Therefore, there is a need for systems, methods and apparatuses for providing quick enablement of suppliers to commerce networks.

SUMMARY

An embodiment includes a computer-method of a buyer/supplier network aiding supplier enablement through creation of a requisition between a buyer and a supplier. The method includes receiving, by the buyer/supplier network, a collaboration request for information about a good or service being purchased by a buyer. At least one supplier is identified from an approved supplier list that has the requested information. An account is created for each of the identified suppliers on the buyer/supplier network, and an invitation is sent to each of the suppliers to join the buyer/supplier network. Each of the invited suppliers is allowed to log into the buyer/supplier network through the invitation, and address the request for information.

Another embodiment includes a buyer/supplier network that aids in creation of at least one of a requisition between a buyer and a supplier. The buyer/supplier network includes a buyer/seller server operative to receive a collaboration request for information about a good or service from a buyer. Either a procurement server or the buyer/seller server is operative identify at least one supplier from an approved supplier list that has the requested information. The buyer/seller server is operative create an account for each of the identified suppliers on the buyer/supplier network. The buyer/seller server sends an invitation to each of the suppliers to join the buyer/supplier network. The buyer/seller server is operative allow each of the invited suppliers to log into the buyer/supplier network through the invitation, and address the request for information.

Another embodiment includes a program storage device readable by a machine, tangibly embodying a program of instructions executable by the machine to perform a computer-method of a buyer/supplier network aiding supplier enablement through creation of a requisition between a buyer and a supplier. When executed, the computer-method performs the following steps: receiving a collaboration request for information about a good or service being purchased by a buyer, identifying at least one supplier from an approved supplier list that has the requested information, creating an account for each of the identified suppliers on the buyer/supplier network, sending an invitation to each of the suppliers to join the buyer/supplier network, and allowing each of the invited suppliers to log into the buyer/supplier network through the invitation, and address the request for information.

Other aspects and advantages of the described embodiments will become apparent from the following detailed description, taken in conjunction with the accompanying drawings, illustrating by way of example the principles of the described embodiments.

DETAILED DESCRIPTION

The embodiments described include methods, systems and apparatuses for a supplier/buyer commerce network that provides quick enablement of a supplier through collaboration between a buyer and suppliers. An embodiment includes a supplier being enabled with a single "one click" of the buyer. An embodiment includes the supplier/buyer commerce network (supplier network) receiving a commercial transaction associated with a business process between a supplier and a buyer, wherein the commercial transaction includes a purchase order for the supplier; determining, using a processor, that the supplier is not a member of a supplier network; and in response to the determination, initiating a supplier enablement action, wherein the supplier enablement action is associated with enabling the supplier to join the supplier network. Further, for an embodiment, the supplier/buyer commerce network (supplier network) includes an interface configured to receive a commercial transaction associated with a business process between a supplier and a buyer, wherein the commercial transaction includes a purchase order for the supplier; and a processor configured to: determine that the supplier is not a member of a supplier network; and initiate a supplier enablement action in response to the determination, wherein the supplier enablement action is associated with enabling the supplier to join the supplier network.

In certain situations, a buyer can be purchasing a good or service that is complex enough that the buyer ideally receives some instructive information from informed suppliers. The embodiments described provide a commerce network that can determine when a buyer is purchasing a complex good or service, and intelligently connect the buyer with a set of suppliers that have information about the good or service that can simplify the purchasing process for the buyer. Further, an approved set of suppliers can be enabled to allow the suppliers to conduct business with the buyer through the commerce network. For at least one embodiment, the approved list of suppliers is received from the buyer, and selected suppliers from the approved list are enabled and allowed to fulfill the buyer's need for the complex good or service. Enablement is completed by getting suppliers to join a supply network (that is, supplier enablement). The described embodiments simply and efficiently implement the enablement process for suppliers (quick enable) that are provided by the buyer.

Figure 1:
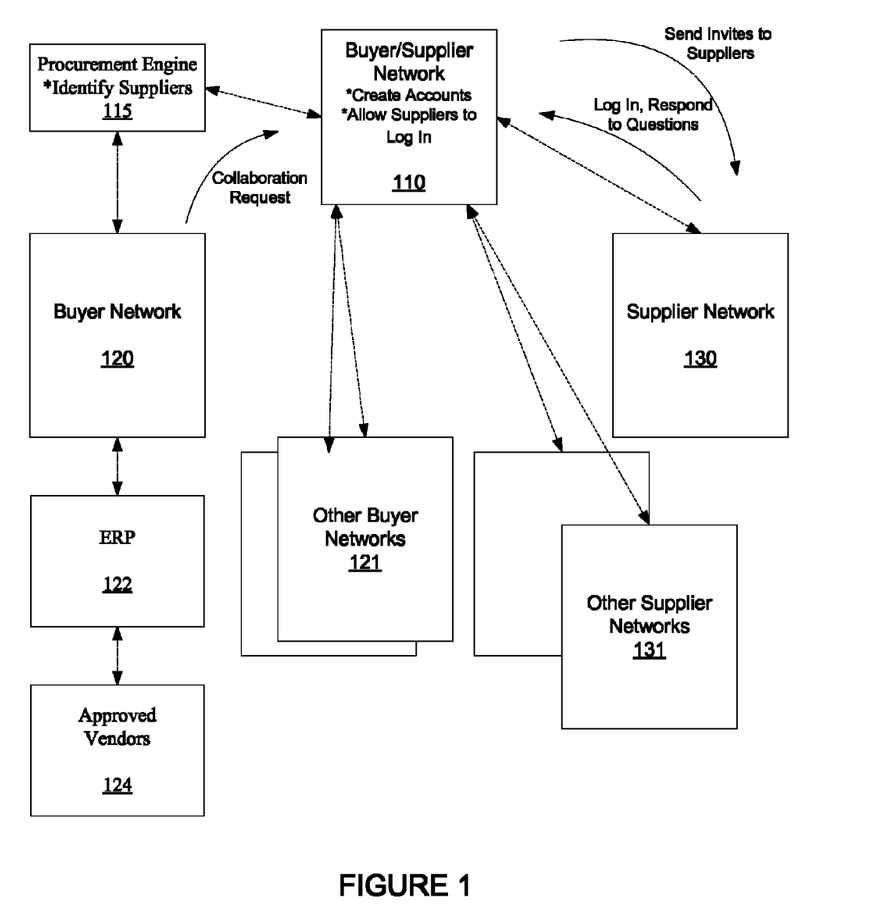
FIG. 1 shows an example of a system that facilitates a supplier/buyer commerce network in electronically enabling suppliers.

FIG. 1 shows an example of a system that facilitates a supplier/buyer commerce network 110 in electronically enabling suppliers of supplier networks 130, 131. A buyer of a buyer network 120 is generally associated with the supplier/buyer commerce network 110 in some capacity. However, the suppliers 130, 131 can be either associated (enabled) or not associated (not enabled) with the supplier/buyer commerce network 110. Embodiments of the buyer network 120 and the supplier networks 130, 131 include enterprise networks that include one or more servers, wherein the servers include processors. The buyer network 120 and the supplier networks 130, 131 are connected to the supplier/buyer commerce network 110 through network connections. The supplier/buyer commerce network 110 is interfaced with the buyer network 120 and the supplier networks 130, 131 through the network. The supplier/buyer commerce network 110 includes one or more servers, wherein each server includes processors. While the embodiments described generally include a single buyer network 120, clearly, many buyer networks (other buyer networks 121) can be connected to the supplier/buyer commerce network 110, and further facilitate supplier/buyer commerce network 110 in electronically enabling suppliers of supplier networks.

For an embodiment, a buyer on the buyer network 120 accesses a procurement engine 115 for the purchase of a good or service. The procurement engine 115 can operate on either the buyer/supplier network 110, the buyer network 120 or separately. Embodiments of the procurement engine 115 host supplier catalogs for purchasing. The hosted catalogs can include both suppliers that are associated with the supplier/buyer commerce network 110 and/or suppliers that are buyer approved. Additionally, the procurement engine 115 can support network defined purchasing policies, and manage purchasing approvals by buyer entities.

Embodiments of the procurement engine 115 deduce when a buyer of the buyer network 120 is attempting to purchase a complex good or service. For an embodiment, the procurement engine maintains a list of what are deemed to be complex goods or services. If so deemed, it is assume that the buyer will need information about the good or service that aids the buyer in the purchase of the good or service. That is, by being supplemented with the information about the good or service, the buyer can make a more intelligent decision about the purchase. Other embodiments include monitoring the actions of the buyer, and if certain behavior patterns are observed while the buyer is using the procurement engine 115, the procurement engine 115 determines that the buyer is perceiving the purchase of the good or service to be complex. One embodiment includes identifying that a buyer is attempting to purchase a complex good or service by tracking the buyer's behavior, and identifying that the buyer is navigating between similar products of a similar category of products. For example, observing that the buyer is navigating between similar catalog items (product or service) of a first supplier and a second supplier. This navigation suggests that the buyer is not sure what product or service to purchase, and therefore, need additional product or service information.

The detection of the buyer of the buyer network 120 attempting to purchase a complex good or service results or triggers a collaboration request. For an embodiment, the collaboration request includes a set of approved and/or not approved vendors of the buyer. The approved list can be obtained, for example, from an approved list of vendors 124 associated with an Enterprise Resource Planning (ERP) network 122. For many businesses ERP applications include complex information systems that support and automate business processes such as human resources, manufacturing, distribution, project management, payroll, and/or financials. A non-approved list can be obtained, for example, from a third party that has information of providers of the good or service that the buyer is attempting to purchase.

For embodiments, the list is narrowed to a select set of suppliers that are likely candidates to be able to provide useful information to the buyer in the purchase of the good or service being pursued by the buyer. The good or service desired by the buyer of the buyer network 120 is known by the procurement engine 115 and the buyer/supplier network 110. Based on knowledge of the product or service, and knowledge of the suppliers of the list, and appropriate set of suppliers can be logically selected.

Embodiments include both the list of suppliers being derived from supplier profiles managed by the buyer/supplier network 110 and the approved suppliers from buyer network 120. Products, locations and other parameters of the supplier profile can be used to rank the probability that the suppliers will be able to provide useful information for the buyer in the buyer's purchase of the complex good or service. The top ranked, or suppliers having a selected rank or better can be selected as the select set of suppliers that receive invitations.

The supplier profile can include at least one of self-reported information, community information third party information, and/or aggregated activity information. Generally, supplier profile includes a collection of information pertaining to the corresponding company that is associated with the network.

The self-reported information includes company provided information that can be received by the buyer/supplier network and incorporated into the company profile. The self-reported information can be received in different ways. For example, a company may effectively "walk up" and join the supplier/buyer commerce network, or the company information can be loaded by the buyer/supplier network 110 or from another database or application. The self-reported information can include both public information, as well as private information (for example, credit card and/or personal information). For an embodiment, the public information becomes a part of the profile.

For embodiments, pieces of the self-reported information are used to drive additional processes in the supplier/buyer commerce network. That is, for example the self-reported information can include a DUNS number field. Once the supplier/buyer commerce network has the DUNS number, the supplier/buyer commerce network can provide financial risk score information on the supplier. The DUNS number can be used to drive communication with, for example, a third party. Additionally, a matching process can be utilized to analyze commodities (goods & services) a supplier has selected as providing, and the sales territories of the supplier, in order to match that supplier's profile against the business opportunities.

The community information includes information that pertains to the company that is provided by supplier networks 130, 131 and buyer networks (such as, buyer network 120) associated with the network. The community information includes, for example, ratings. The ratings allow, for example, a buyer to rate any supplier that has responded to a business opportunity on the supplier/buyer commerce network 110.

Another aspect of the community information includes references. For example, a supplier may request a buyer to leave a reference for the supplier. For embodiments, the supplier solicits the reference by supplying the email address of the buyer, or otherwise identifies the buyer. To further facilitate community and parallel real world interactions, embodiments of the supplier/buyer commerce network allows other buyers to request contact with the author of any given reference. For embodiments, the subject of the reference (the supplier) is the gatekeeper in such an interaction and may decline or accept the third party's request to speak with a reference. For embodiments, the reference itself contains a few pieces of information, for example, a text narrative, industry of the buyer, and/or length of the business relationship.

The third party information includes information that pertains to the company that is provided by a third party who is typically not associated directly with the network. The third party information includes, for example, a business and credit rating provided by, for example, an established rating agency (such as, Dun & Bradstreet® (D&B)). The third party information can include financial risk information about suppliers. This can be provided, for example, using self-reported DUNS number information. The DUNS information can be validated with D&B using an API call. The validated information can be displayed back to the supplier for their approval. Once approved, the supplier/buyer commerce network basically has the supplier linked to a risk profile on D&B.

The aggregated activity information includes, for example, transactional activity of the company. The aggregated activity information includes information about suppliers and their performance on the supplier/buyer commerce network 110.

A useful piece of aggregated activity information included within the company profile is the number of transacting relationships that the company has with buyers/suppliers of buyer/supplier networks on the supplier/buyer commerce network 110, and/or transacting relationships the company has with buyers/suppliers of other commerce networks, such as cloud networks. This information provides a valuable picture of how many other companies the company is actively doing business with via the supplier/buyer commerce network 110, and the cloud networks. It is to be understood that doing business with other companies includes activities can include interactions that do not include money, good or services changing hands. If the supplier/buyer commerce network 110 is interfaced with cloud networks, the company profile can be made to be common (the same) between commerce network platforms. Therefore, real-time information can be utilized across the supplier/buyer commerce network 110 and external cloud network platforms.

Examples of aggregated activity information include, but are not limited to, event invitations, invitations by revenue, transaction awards (for example, winning supplier bids), revenue ranges, and/or top bids by industry.

Embodiments include creating an account, and sending invitations to the set of suppliers. Generally, creating an account includes assigning a supplier a unique identification (ID) in the buyer/supplier network 110. For an embodiment, the invitations are sent (for example, email) that includes a URL to log into the buyer/supplier network 110.

Sending invitation includes, for example, electronically communicating the collaboration request to the set of suppliers. This can include, for example, emailing the collaboration request to the set of suppliers. Additionally, or alternatively, the electronic communication can be made to the set suppliers by, faxing, phoning, tweeting, or through a small message system (sms). The electronic addresses of the suppliers can be received from the buyer or from the supplier profile.

Once the set of suppliers have electronically received invitations, the invited suppliers can log into the buyer/supplier network 110 through the invitation, and address the request for information. The invitations can be sent, for example, as an email that includes a link to a website of the buyer/supplier network 110. For an embodiment, the supplier is enabled when the supplier logs into the account created on the buyer/supplier network 110. The set of suppliers can then address questions of the buyer associated with the purchase of the complex good or service after logging in to the buyer/supplier network 110. The log-in procedure can be managed directly by the buyer/supplier network 110, but can additionally or alternatively be managed by the procurement engine 115. The buyer then logs into the buyer/supplier network 110 or the procurement engine 115 to obtain the information provided by the enabled suppliers.

After addressing the questions, the supplier or the supplier network 130 is enabled and is associated with the buyer/supplier network 110. For an embodiment, the supplier is enabled for transactions with the buyer only. That is, the supplier was received through the collaboration request initiated by the buyer, and was submitted as an approved vendor of the buyer. Therefore, the buyer/supplier network assumes the buyer has approved of the supplier, and therefore, the supplier is enabled for future transactions with the buyer through the buyer/supplier network 110. The future transactions can include, for example, the completion of a purchase order between the buyer and at least one of the set of suppliers.

An embodiment includes merging the accounts of a supplier if, for example, the supplier is enabled with more than one buyer. That is, the supplier can be enabled to conduct business through the buyer/supplier network 110, and have an account that was set up for each of the individual buyers. This embodiment includes merging the multiple accounts into a single account.

Figure 2:
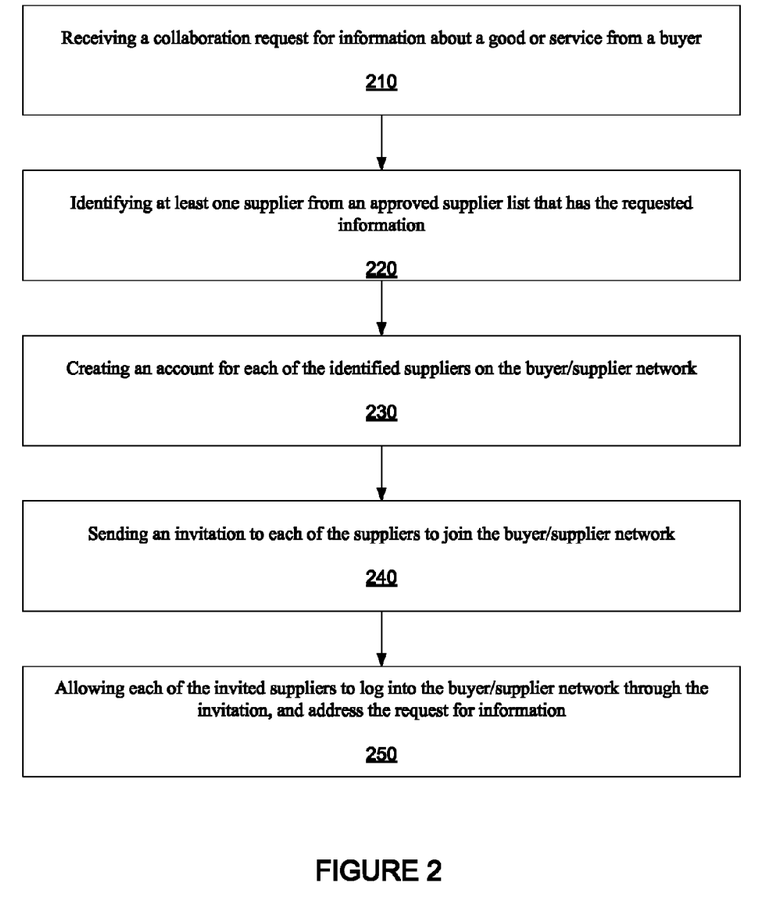
FIG. 2 is a flow chart that includes steps of an example of a computer-method of a buyer/supplier network aiding supplier enablement through creation of a requisition between a buyer and a supplier.

FIG. 2 is a flow chart that includes steps of an example of a computer-method of a buyer/supplier network aiding supplier enablement through creation of a requisition between a buyer and a supplier. A first step 210 includes receiving a collaboration request for information (for example, help) about a good or service from a buyer. For an embodiment, the collaboration request can be automatically generated by the buyer/supplier network, or by an associated procurement engine when identifying that the buyer is attempting to purchase a complex good or service. That is, the collaboration request does not have to be proactively made by the buyer. A second step 220 includes identifying at least one supplier from an approved supplier list that has the requested information (that is, a supplier that can provide the desired help). For embodiments, the at least one supplier can be identified by the buyer/supplier network, or by an associated procurement engine. A third step 230 includes creating an account for each of the identified suppliers on the buyer/supplier network. A fourth step 240 includes sending an invitation to each of the suppliers to join the buyer/supplier network. A fifth step 250 includes allowing each of the invited suppliers to log into the buyer/supplier network through the invitation, and address the request for information.

As previously described, at least some embodiments of the buyer (buyer network) and the suppliers (supplier networks) include enterprise networks that include one or more servers, wherein the servers include processors. The buyer network and the supplier networks are connected to the supplier/buyer network through network connections. At least some embodiments of the supplier/buyer network are interfaced with the buyer network and the supplier networks through the network. At least some embodiments of the supplier/buyer network include one or more servers, wherein each server includes processors.

An embodiment includes the buyer/supplier network facilitating the buyer sending a purchase order to the supplier after one or more of the supplier has logged in and joined the buyer/supplier network. That is, the supplier has been enabled, and can then conduct business transactions with the buyer through (managed by) the buyer/supplier network.

For an embodiment, the collaboration request is received from the buyer while the buyer is operating within a buyer/supplier network procurement engine. More specifically, and embodiment includes the buyer/supplier network procurement engine identifying that the buyer is attempting to purchase a complex product or service, and pushing descriptive information of the complex product or service to the buyer/supplier network, and pushing a filtered list of approved suppliers to the buyer/supplier network. For an embodiment, the buyer/supplier network procurement engine is within the buyer/supplier network. However, the buyer/supplier network procurement engine can be located outside of the buyer/supplier network.

For an embodiment, the buyer desires to purchase a complex product or service, and the collaboration request is submitted by the buyer to aid the buyer in completing an order, and/or purchasing the complex good or service. For embodiments, the collaboration request of information includes an information request pushed by the buyer to aid the buyer in a purchase of a product or service. For another embodiment, the collaboration request is submitted by the buyer/supplier network or the procurement engine. As described, the submission by the buyer/supplier network or the procurement engine can be triggered by detecting the buyer is attempting to purchase a complex good or service by identifying the good or service as being on a predefined list, or by detecting behavior characteristics of the buyer that suggest the buyer is attempting to purchase as complex good or service.

Once received by the buyer/supplier network, and the set of suppliers have been identified, an embodiment further includes providing the information request to the identified set of suppliers. Clearly, the set can include one or more suppliers.

As described, for an embodiment, the approved supplier list is received by the buyer/supplier network within the collaboration request. For a specific embodiment, the buyer has an enterprise resource planning (ERP) system, and the approved supplier list includes approved vendors from the ERP system of the buyer.

For an embodiment, the buyer/supplier network enables (activates) the at least one supplier, establishing a connection on the buyer/supplier network between the buyer and the at least one supplier. Once activated (enabled) the at least one supplier can push information to the buyer. This information can include, for example, invoices or catalogs of the supplier. As previously described, once enabled, multiple accounts of the supplier can be merged into a single account, while the supplier is enabled to complete business transactions and push information to multiple buyers. Merging accounts is advantageous because the supplier can login with one set of user name and password and visibility of all buyers in one view.

For an embodiment, at least one of the identified suppliers is new to the buyer/supplier network, and the buyer creates an account for the at least one identified supplier by submitting the at least one identified supplier through the collaboration request. Further the buyer/supplier network creates an account for the at least one identified supplier in response to the collaboration request.

Figure 3:
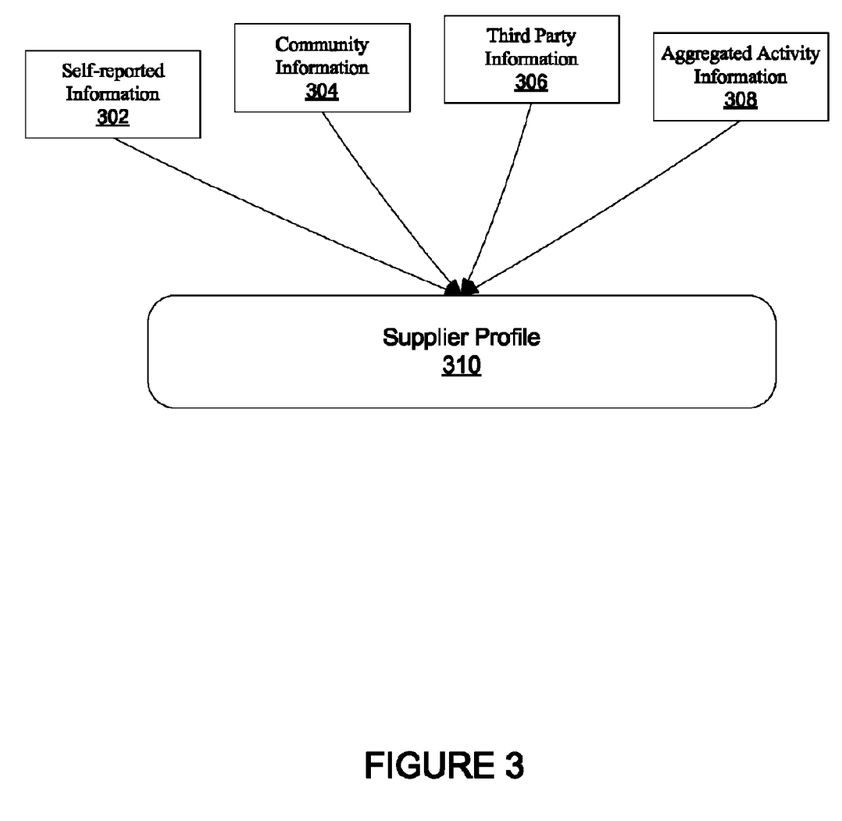
FIG. 3 is a diagram that illustrates an example of a method a supplier/buyer commerce network electronically maintaining a profile of a supplier.

FIG. 3 is a flow chart that includes steps of an example of a method a supplier/buyer commerce network electronically maintaining a profile of a supplier. The supplier profile 310 can be maintained by the buyer/supplier network, and can include receiving self-reported information 302, community information 304, third party information 306 and/or aggregated activity information 308.

Figure 4:
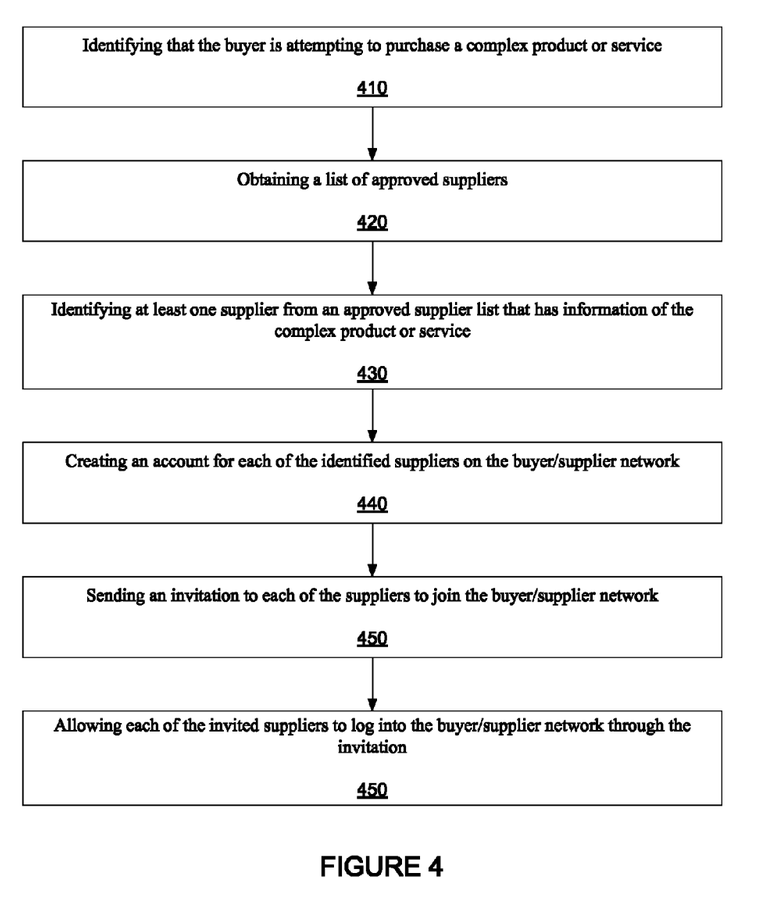
FIG. 4 is a flow chart that includes steps of another example of a computer-method of a buyer/supplier network aiding supplier enablement through creation of a requisition between a buyer and a supplier.

FIG. 4 is a flow chart that includes steps of an example of another computer-method of a buyer/supplier network aiding supplier enablement through creation of a requisition between a buyer and a supplier. A first step 410 includes identifying that the buyer is attempting to purchase a complex product or service. A second step 420 includes obtaining a list of approved suppliers. A third step 430 includes identifying at least one supplier from an approved supplier list that has information of the complex product or service. A fourth step 440 includes creating an account for each of the identified suppliers on the buyer/supplier network. A fifth step 450 includes sending an invitation to each of the suppliers to join the buyer/supplier network. A sixth step 460 includes allowing each of the invited suppliers to log into the buyer/supplier network through the invitation.

For this embodiment, the buyer/supplier network obtains the list of approved suppliers. Buyer/supplier network receives a complex good/service collaboration request and matches the list of approved buyers with the collaboration request. Various methods can be used to obtain the list of suppliers as previously described.

Figure 5:
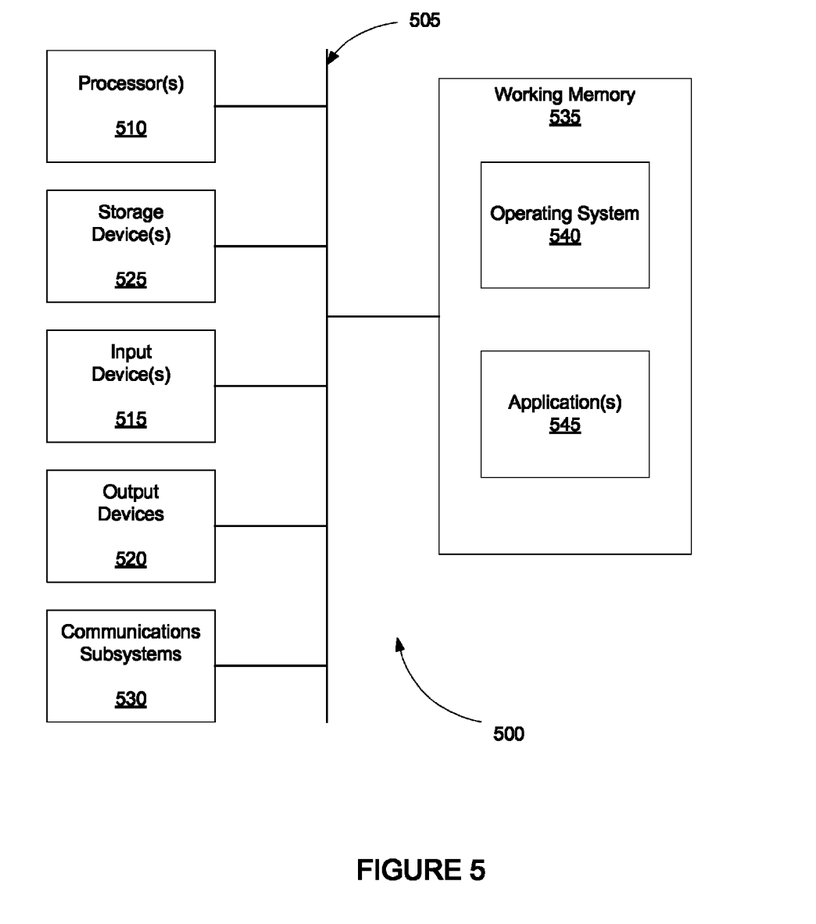
FIG. 5 shows a schematic illustration of one embodiment of a computer system that can perform the methods of the described embodiment, and/or can function as, for example, a supplier/buyer commerce network that facilitates a supplier/buyer commerce network in electronically enabling suppliers.

FIG. 5 shows a schematic illustration of one embodiment of a computer system that can perform the methods of the described embodiment, and/or can function as, for example, a buyer/supplier network that aids supplier enablement through creation of a requisition between a buyer and a supplier. It should be noted that FIG. 5 is meant only to provide a generalized illustration of various components, any or all of which may be utilized as appropriate. FIG. 5, therefore, broadly illustrates how individual system elements may be implemented in a relatively separated or relatively more integrated manner.

The computer system 500 is shown comprising hardware elements that can be electrically coupled via a bus 505 (or may otherwise be in communication, as appropriate). The hardware elements can include one or more processors 510, communication subsystems 530, one or more input devices 515, which can include without limitation a mouse, a keyboard and/or the like; and one or more output devices 520, which can include without limitation a display device, a printer and/or the like. The computer system 500 may further include (and/or be in communication with) one or more storage devices 525. The computer system 500 also can comprise software elements, shown as being located within the working memory 535, including an operating system 540 and/or other code, such as one or more application programs 545, which may comprise computer programs of the described embodiments, and/or may be designed to implement methods of the described embodiments of a computer-method of a buyer/supplier network aiding supplier enablement through creation of a requisition between a buyer and a supplier and/or configure systems of the embodiments as described herein.

At least some embodiments includes a program storage device readable by a machine (of the supplier/buyer commerce network), tangibly embodying a program of instructions executable by the machine to perform a computer-method of a buyer/supplier network aiding supplier enablement through creation of a requisition between a buyer and a supplier. When executed, the computer-method performs the following steps: receiving a collaboration request for information about a good or service being purchased by a buyer, identifying at least one supplier from an approved supplier list that has the requested information, creating an account for each of the identified suppliers on the buyer/supplier network, sending an invitation to each of the suppliers to join the buyer/supplier network, and allowing each of the invited suppliers to log into the buyer/supplier network through the invitation, and address the request for information.

Although specific embodiments have been described and illustrated, the embodiments are not to be limited to the specific forms or arrangements of parts so described and illustrated.

What is claimed:

1. A computer-method of a buyer/supplier network aiding supplier enablement through creation of a requisition between a buyer and a supplier, comprising:
    receiving, by the buyer/supplier network, a collaboration request for information about a good or service being purchased by a buyer;
    identifying, by a buyer/supplier network procurement engine, that the buyer is attempting to purchase a complex product or service based on tracking the buyer's behavior;
    pushing by the buyer/supplier network, descriptive information of the complex product or service to the buyer based on identifying the buyer is attempting to purchase a complex product or service;
    identifying by the buyer/supplier network, at least one supplier from an approved supplier list that has the requested information, and pushing a filtered list of approved suppliers to the buyer based on identifying the buyer is attempting to purchase a complex product or service;
    creating an account for each of the identified suppliers on the buyer/supplier network;
    sending an invitation to each of the suppliers to join the buyer/supplier network; and
    allowing each of the invited suppliers to log into the buyer/supplier network through the invitation, and address the request for information.

2. The computer-method of claim 1, further comprising facilitating the buyer sending a purchase order to the supplier.

3. The computer-method of claim 1, wherein the collaboration request is received from the buyer while the buyer is operating within the buyer/supplier network procurement engine.

4. The computer-method of claim 1, wherein the buyer desires to purchase a complex product or service, and the collaboration request is submitted by the buyer to aid the buyer in purchasing the complex good or service.

5. The computer-method of claim 1, wherein the buyer desires to purchase a complex product or service, and the collaboration request is submitted by the buyer to aid the buyer in completing an order for the complex good or service.

6. The computer-method of claim 1, wherein the collaboration request of information comprises an information request pushed by the buyer to aid the buyer in a purchase of a product or service.

7. The computer-method of claim 6, further comprising providing the information request to the identified at least one supplier.

8. The computer-method of claim 1, wherein the approved supplier list is received by the buyer/supplier network within the collaboration request.

9. The computer-method of claim 8, wherein the buyer has an enterprise resource planning (ERP) system, and the approved supplier list comprises approved vendors from the ERP system of the buyer.

10. The computer-method of claim 8, wherein further comprising the buyer/supplier network activating the at least one supplier, establishing a connection on the buyer/supplier network between the buyer and the at least one supplier.

11. The method of claim 10, wherein once the at least one supplier has been activated, the at least one supplier can push information to the buyer.

12. The method of claim 1, wherein at least one of the identified suppliers is new to the buyer/supplier network, and the buyer creates an account for the at least one identified supplier by submitting the at least one identified supplier through the collaboration request, and further comprising the buyer/supplier network creating an account for the at least one identified supplier in response to the collaboration request.

13. A buyer/supplier network that aids in creation of at least one of a requisition or contract between a buyer and a supplier, comprising:
    a buyer/seller server operative to receive a collaboration request for information about a good or service from a buyer;
    a procurement sever operative to identify that the buyer is attempting to purchase a complex product or service based on tracking the buyer's behavior;
    at least one of a procurement server or the buyer/seller server operative to push descriptive information of the complex product or service to the buyer based on identifying the buyer is attempting to purchase a complex product or service;
    at least one of a procurement server or the buyer/seller server operative to identify at least one supplier from an approved supplier list that has the requested information, and push a filtered list of approved suppliers to the buyer based on identifying the buyer is attempting to purchase a complex product or service;
    the buyer/seller server operative create an account for each of the identified suppliers on the buyer/supplier network;
    the buyer/seller server operative send an invitation to each of the suppliers to join the buyer/supplier network; and
    the buyer/seller server operative allow each of the invited suppliers to log into the buyer/supplier network through the invitation, and address the request for information.

14. The buyer/supplier network of claim 13, wherein the approved supplier list is received by the buyer/supplier network within the collaboration request.

15. The buyer/supplier network of claim 14, wherein the buyer has an enterprise resource planning (ERP) system, and the approved supplier list comprises approved vendors from the ERP system of the buyer.

16. The buyer/supplier network of claim 14, wherein further comprising the buyer/supplier network activating the at least one supplier, establishing a connection on the buyer/supplier network between the buyer and the at least one supplier.

17. The buyer/supplier network of claim 16, wherein once the at least one supplier has been activated, the at least one supplier can push information to the buyer.

18. The buyer/supplier network of claim 14, wherein at least one of the identified suppliers is new to the buyer/supplier network, and the buyer creates an account for the at least one identified supplier by submitting the at least one identified supplier through the collaboration request, and further comprising the buyer/supplier network creating an account for the at least one identified supplier in response to the collaboration request.

19. A non-transitory program storage device readable by a machine, tangibly embodying a program of instructions executable by the machine to perform a computer-method of a buyer/supplier network aiding supplier enablement through creation of a requisition between a buyer and a supplier, comprising:
   receiving a collaboration request for information about a good or service being purchased by a buyer;
   identifying that the buyer is attempting to purchase a complex product or service based on tracking the buyer's behavior;
   pushing descriptive information of the complex product or service to the buyer based on identifying the buyer is attempting to purchase a complex product or service;
   identifying at least one supplier from an approved supplier list that has the requested information, and pushing a filtered list of approved suppliers to the buyer based on identifying the buyer is attempting to purchase a complex product or service;
   creating an account for each of the identified suppliers on the buyer/supplier network;
   sending an invitation to each of the suppliers to join the buyer/supplier network; and
   allowing each of the invited suppliers to log into the buyer/supplier network through the invitation, and address the request for information.

20. A computer-method of a buyer/supplier network aiding supplier enablement through creation of a requisition between a buyer and a supplier, comprising:
   Identifying, by a processor, that the buyer is attempting to purchase a complex product or service based on tracking the buyer's behavior;
   pushing descriptive information of the complex product or service to the buyer based on identifying the buyer is attempting to purchase a complex product or service;
   receiving, by the buyer/supplier network, a filtered list of approved suppliers, and pushing a filtered list of approved suppliers to the buyer based on identifying the buyer is attempting to purchase a complex product or service;
   identifying at least one supplier from an approved supplier list that has information of the complex product or service;
   receiving a commercial transaction associated with a business process between the at least one identified supplier and the buyer, wherein the commercial transaction includes a purchase order for the at least one supplier;
   determining, using a processor, that the at least one supplier is not a member of a supplier network; and in response to the determination, initiating a supplier enablement action, wherein the supplier enablement action is associated with enabling the at least one supplier to join the supplier network.

* * * * *